US009755733B2

(12) United States Patent
Aoki

(10) Patent No.: US 9,755,733 B2
(45) Date of Patent: Sep. 5, 2017

(54) OPTICAL COMMUNICATION SYSTEM AND OPTICAL COMMUNICATION METHOD

(71) Applicant: FUJITSU LIMITED, Kawasaki-shi, Kanagawa (JP)

(72) Inventor: Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/080,830

(22) Filed: Mar. 25, 2016

(65) Prior Publication Data
US 2016/0315695 A1 Oct. 27, 2016

(30) Foreign Application Priority Data
Apr. 24, 2015 (JP) .................. 2015-089429

(51) Int. Cl.
H04B 10/03 (2013.01)
H04B 10/038 (2013.01)
H04B 10/2575 (2013.01)
H04J 14/02 (2006.01)
H04Q 11/00 (2006.01)

(52) U.S. Cl.
CPC .......... *H04B 10/03* (2013.01); *H04B 10/038* (2013.01); *H04B 10/25752* (2013.01); *H04B 10/25755* (2013.01); *H04J 14/0227* (2013.01); *H04Q 11/0067* (2013.01); *H04Q 2011/0081* (2013.01)

(58) Field of Classification Search
CPC .................. H04B 10/03; H04B 10/038; H04B 10/25752; H04B 10/25755; H04J 14/0227; H04Q 11/0067; H04Q 2011/0081

USPC .............................................. 398/7
See application file for complete search history.

(56) References Cited

U.S. PATENT DOCUMENTS 5,884,017 A 3/1999 Fee
2004/0228631 A1* 11/2004 Mantin ............... H04J 14/0204
398/83

(Continued)

FOREIGN PATENT DOCUMENTS

EP 2200191 A1 6/2010
EP 2753141 A1 7/2014

(Continued)

OTHER PUBLICATIONS

EESR—The Extended European Search Report of European Patent Application No. 16160109.1 dated Sep. 14, 2016.

Primary Examiner — Dalzid Singh
(74) Attorney, Agent, or Firm — Fujitsu Patent Center

(57) ABSTRACT

An optical communication system includes: a first network-side device and a second network-side device each coupled to a communication network; and a first terminal-side device and a second terminal-side device configured to communicate with the first network-side device and the second network-side device by being coupled to the first network-side device and the second network-side device via a first communication cable and a second communication cable, respectively, wherein the first network-side device is coupled to the first terminal-side device via the communication network, the second network-side device, and a third communication cable for coupling the second network-side device and the first terminal-side device so as to communicate between the first network-side device and the first terminal-side device.

12 Claims, 11 Drawing Sheets

(56) References Cited

U.S. PATENT DOCUMENTS

| | | | |
|---|---|---|---|
| 2006/0210274 A1* | 9/2006 | Lichtman | H04J 14/0201 398/83 |
| 2008/0013950 A1* | 1/2008 | Boudreault | H04J 14/0212 398/59 |
| 2008/0131124 A1 | 6/2008 | Nam et al. | |
| 2010/0092173 A1* | 4/2010 | Matsuo | H04J 3/1611 398/50 |

FOREIGN PATENT DOCUMENTS

| | | | |
|---|---|---|---|
| IT | WO 2007115019 A2 * | 10/2007 | H04J 14/0204 |
| JP | 2014-90346 | 5/2014 | |

\* cited by examiner

FIG. 6

| RRHID | POSITION | AVERAGE AMOUNT OF TRAFFIC (0 TO 24 HOURS) |
|---|---|---|
| RRHID#1 | POS#1 | 50 Mbps |
| RRHID#2 | POS#2 | 100 Mbps |
| ⋮ | ⋮ | ⋮ |

FIG. 10

| RRHID | POSITION | AVERAGE AMOUNT OF TRAFFIC $\left(\begin{array}{c}\text{MOST RECENT}\\\text{10 MINUTES}\end{array}\right)$ |
|---|---|---|
| RRHID#1 | POS#1 | 50 Mbps |
| RRHID#2 | POS#2 | 100 Mbps |
| ⋮ | ⋮ | ⋮ |

FIG. 11

| RRHID | POSITION | AVERAGE AMOUNT OF TRAFFIC (0 TO 6 HOURS) | AVERAGE AMOUNT OF TRAFFIC (6 TO 12 HOURS) | AVERAGE AMOUNT OF TRAFFIC (12 TO 18 HOURS) | AVERAGE AMOUNT OF TRAFFIC (18 TO 24 HOURS) |
|---|---|---|---|---|---|
| RRHID#1 | POS#1 | 10 Mbps | 50 Mbps | 100 Mbps | 50 Mbps |
| RRHID#2 | POS#2 | 1 Mbps | 100 Mbps | 200 Mbps | 10 Mbps |
| ... | ... | ... | ... | ... | ... |

OPTICAL COMMUNICATION SYSTEM AND OPTICAL COMMUNICATION METHOD

CROSS-REFERENCE TO RELATED APPLICATION

This application is based upon and claims the benefit of priority of the prior Japanese Patent Application No. 2015-089429, filed on Apr. 24, 2015, the entire contents of which are incorporated herein by reference.

FIELD

The embodiments discussed herein are related to an optical communication system and an optical communication method.

BACKGROUND

An optical communication system including a plurality of network-side devices and a plurality of terminal-side devices is known (for example, refer to Japanese Laid-open Patent Publication No. 2014-090346). The plurality of network-side devices include a plurality of Baseband Units (BBUs). The plurality of terminal-side devices include a plurality of Remote Radio Heads (RRHs). The plurality of network-side devices are coupled to a communication network through which wavelength division multiplexing is performed. The plurality of terminal-side devices are coupled to the plurality of network-side devices via a plurality of communication cables so as to individually perform optical communication with the plurality of network-side devices.

SUMMARY

According to an aspect of the invention, an optical communication system includes: a first network-side device and a second network-side device each coupled to a communication network; and a first terminal-side device and a second terminal-side device configured to communicate with the first network-side device and the second network-side device by being coupled to the first network-side device and the second network-side device via a first communication cable and a second communication cable, respectively, wherein the first network-side device is coupled to the first terminal-side device via the communication network, the second network-side device, and a third communication cable for coupling the second network-side device and the first terminal-side device so as to communicate between the first network-side device and the first terminal-side device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a table illustrating an example of load information stored in the control device in FIG. 1;

FIG. 10 is a table illustrating an example of load information stored in the control device according to the second variation of the first embodiment; and FIG. 11 is a table illustrating an example of load information stored in a control device according to a third variation of the first embodiment.

DESCRIPTION OF EMBODIMENTS

Figure 1:
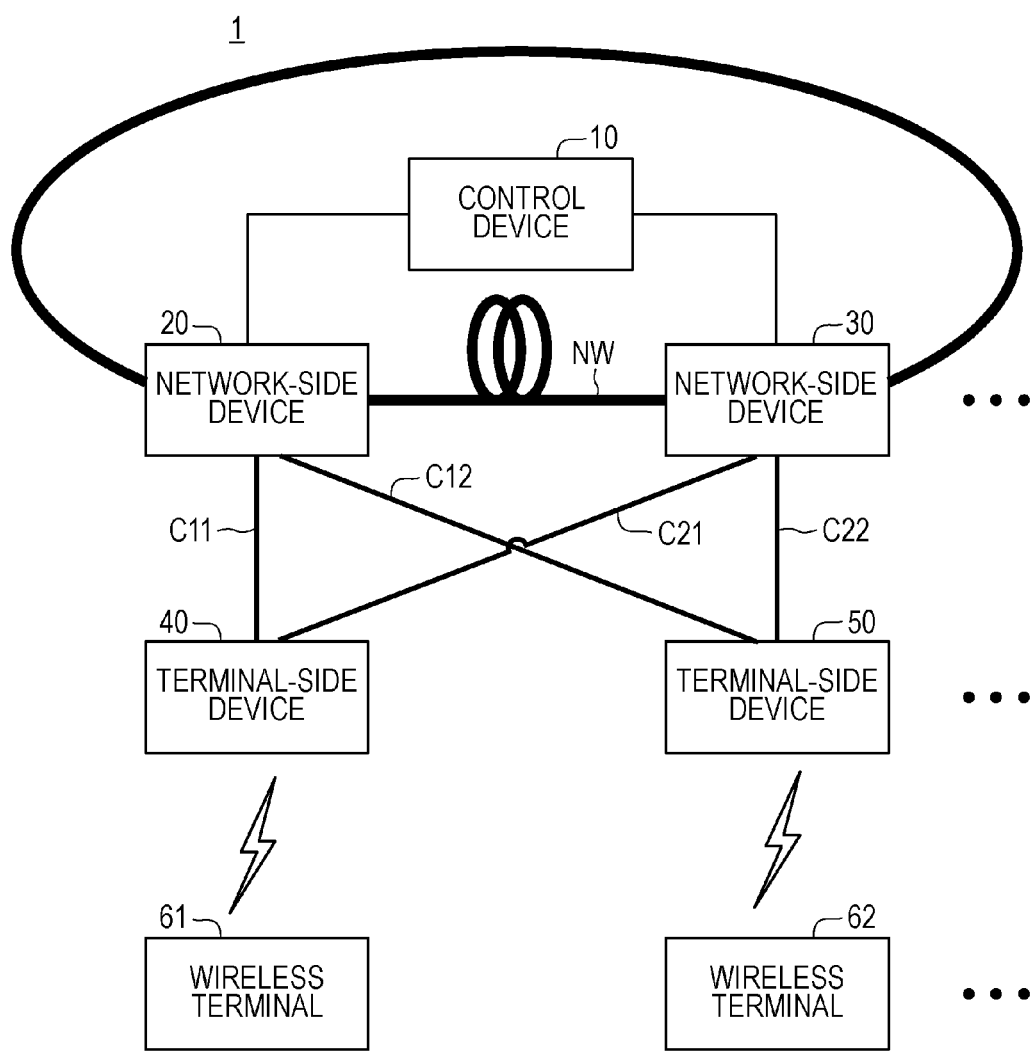
FIG. 1 is a block diagram illustrating an example of a configuration of a wireless communication system according to a first embodiment.

A communication cable failure sometimes occurs. For example, a failure occurs due to disconnection of a communication cable. Thus, it is thought that communication path redundancy is provided by coupling a first terminal-side device and a first network-side device via a first communication cable, and at the same time coupling the first terminal-side device and a second network-side device via a second communication cable.

In this case, the first network-side device is provided with a function unit that processes the signals transmitted by optical communication via the first communication cable, and the second network-side device is provided with a function unit that processes the signals transmitted by optical communication via the second communication cable. Accordingly, in this case, the number of function units that process the signals transmitted by optical communication increases as the number of communication paths having redundancy increases.

Descriptions will be given below of embodiments to reduce the number of the function units with reference to the drawings. Note that the embodiments described below are examples. Accordingly, various variations and techniques not specifically described below may be applied to the embodiments. In this regard, in the drawings of the following embodiments, a part to which the same symbol is given represents the same or a similar part unless an alternation or a variation is clearly described.

First Embodiment

Configuration

As illustrated in FIG. 1, a wireless communication system 1 according to a first embodiment includes a control device 10, M sets of a network-side device 20, a network-side device 30, a terminal-side device 40, and a terminal-side device 50, and N wireless terminals 61, 62, . . . . M denotes an integer of 1 or more. N denotes an integer of 2 or more. Each of the wireless terminal 61, 62, . . . is a mobile phone, a smartphone, or the like, for example.

The wireless communication system 1 performs communication in accordance with a predetermined wireless communication method. In the present embodiment, the wireless communication method is the LTE system. LTE is an abbreviation for Long Term Evolution. In this regard, the wireless communication method may entail a system different from the LTE system (for example, a system such as LTE-Advanced, or the like).

A description will be given below with a focus on a set including the network-side device 20, the network-side device 30, the terminal-side device 40, and the terminal-side device 50. However, a description will also be given of another set including the network-side device 20, the network-side device 30, the terminal-side device 40, and the terminal-side device 50 in the same manner.

The network-side devices 20 and 30 are coupled to a communication network NW for performing optical communication. In the present embodiment, the optical communication performed over the communication network NW is wavelength division multiplexing. In the present embodiment, the network-side devices 20 and 30 constitute respective nodes in the communication network NW. In the present embodiment, the communication network NW has a ring-type network topology. In this regard, the communication network NW may have a network topology different from the ring-type network topology.

The network-side device 20 is coupled to the terminal-side devices 40 and 50 via optical communication cables C11 and C12, respectively. The network-side device 30 is coupled to the terminal-side devices 40 and 50 via optical communication cables C21 and C22, respectively. The optical communication cables C11, C12, C21, and C22 each include an optical fiber.

In this regard, the network-side device 20 is an example of the first network-side device. The network-side device 30 is an example of the second network-side device. The terminal-side device 40 is an example of the first terminal-side device. The terminal-side device 50 is an example of the second terminal-side device. The optical communication cable C11 is an example of the first communication cable. The optical communication cable C22 is an example of the second communication cable. The optical communication cable C21 is an example of a third communication cable. The optical communication cable C12 is an example of a fourth communication cable.

The network-side devices 20 and 30 perform optical communication with the terminal-side device 40 or 50 in accordance with a predetermined optical communication method. In the present embodiment, the optical communication method is a method conforming to the Common Public Radio Interface (CPRI) specification. In this regard, the optical communication method may be a method different from a method conforming to CPRI.

Each of the network-side devices 20 and 30 receives data (for example, IP packets) from the other devices (for example, the other network-side devices) coupled to the communication network NW. IP is an abbreviation for Internet Protocol. Each of the network-side devices 20 and 30 executes transmission BB (Baseband) signal processing on the received data and transmits the processed BB signal to the terminal-side device 40 or 50. In the present embodiment, the transmission BB signal processing includes modulation of the data.

Each of the network-side devices 20 and 30 receives a BB signal from the terminal-side device 40 or 50. Each of the network-side devices 20 and 30 executes reception BB signal processing on the received BB signal and transmits the processed data to the other devices (for example, the other network-side devices) coupled to the communication network NW. In the present embodiment, the reception BB signal processing includes demodulation of the BB signal.

Each of the terminal-side devices 40 and 50 receives the BB signal from the network-side device 20 or 30, converts the received BB signal to a radio signal, and transmits the converted radio signal to the wireless terminals 61, 62, . . . by radio. Each of the terminal-side devices 40 and 50 receives the radio signal from the wireless terminals 61, 62, . . . , converts the received radio signal to a BB signal, and transmits the converted BB signal to the network-side device 20 or 30.

In this manner, in the present embodiment, the network-side devices 20 and 30 and the terminal-side devices 40 and 50 constitute a plurality of base station apparatuses. A base station apparatus may be denoted as Evolved Node B (eNB) or Node B (NB).

Each of the base station apparatuses forms a cell. In this regard, each of the base station apparatuses may form a plurality of cells. A cell is an example of a wireless area. The wireless area may be referred to as a coverage area or a communication area. For example, a cell is a macro cell, a micro cell, a nano cell, a pico cell, a femto cell, a home cell, a small cell, a sector cell, or the like. Each of the base station apparatuses communicates by radio with wireless terminals 61, 62, . . . located in the cell formed by the base station apparatus.

The control device 10 is coupled to each of the network-side devices 20 and 30 in a communication-enabled manner. In the present embodiment, the control device 10 is coupled to each of the network-side devices 20 and 30 in a communication-enabled manner via a communication cable separate from the communication network NW. In this regard, the control device 10 may be coupled to each of the network-side devices 20 and 30 in a communication-enabled manner via the communication network NW.

In the present embodiment, the network-side devices 20 and 30 and the terminal-side devices 40 and 50 constitute the optical communication system. In the present embodiment, the optical communication system forms a WDM-PON. WDM-PON is an abbreviation for Wavelength Division Multiplexed Passive Optical Network.

Figure 2:
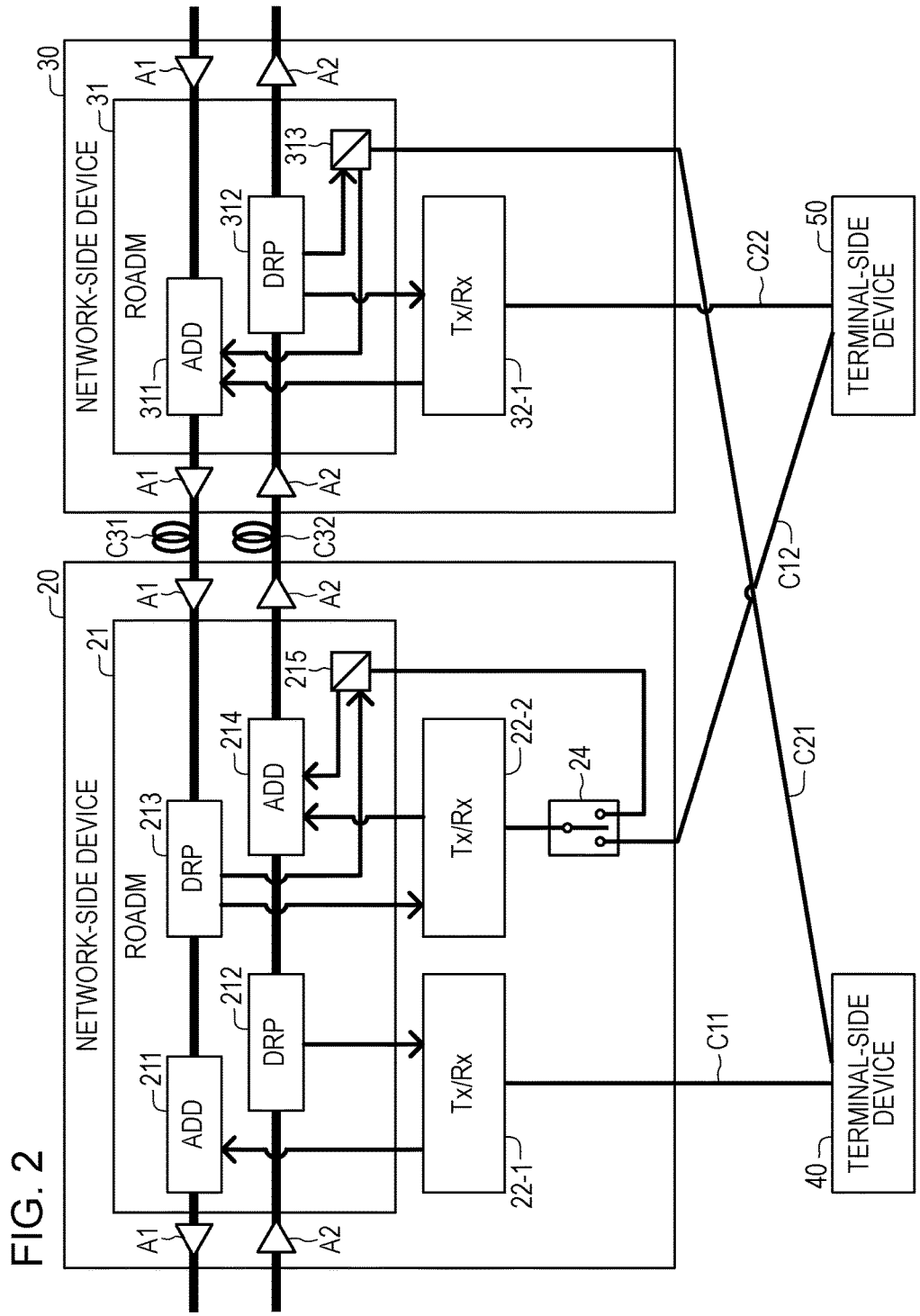
FIG. 2 is a block diagram illustrating an example of a configuration of the network-side device in FIG. 1.

Next, a description will be given of the configuration of the network-side devices 20 and 30. For example, as illustrated in FIG. 2, the network-side device 20 includes an ROADM 21, two transmitter/receivers (Tx/Rx) 22-1 and 22-2, and a switch 24. Further, the network-side device 30 includes an ROADM 31, and a transmitter/receiver (Tx/Rx) 32-1. ROADM is an abbreviation for Reconfigurable Optical Add Drop Multiplexer.

In the present embodiment, the wireless communication system 1 includes an optical communication cable C31 through which an optical signal is transmitted in a clockwise direction in the communication network NW, and an optical communication cable C32 through which an optical signal is transmitted in a counterclockwise direction in the communication network NW. Each of the optical communication cables C31 and C32 includes an optical fiber. In the present embodiment, the optical signal transmitted via optical communication cables C31 and C32 is a wavelength-multiplexed optical signal. A wavelength-multiplexed optical signal is an optical signal in which a plurality of optical signals having different wavelengths are multiplexed.

The ROADM 21 includes optical adding units (ADD) 211 and 214, optical dropping units (DRP) 212 and 213, and an optical coupler 215.

The optical adding unit (ADD) 211 inserts an optical signal having a wavelength included in a first wavelength group, which has been input from the transmitter/receiver (Tx/Rx) 22-1, into an optical signal transmitted via the optical communication cable C31. The first wavelength group includes a wavelength assigned to the optical communication between the BBU of the transmitter/receiver (Tx/Rx) 22-1 and the RRH of the terminal-side device 40 among the wavelengths available for wavelength division multiplexing in the communication network NW. A description will be given later of BBU and RRH. Insertion of an optical signal may be referred to as addition of an optical signal.

The optical dropping unit (DRP) 212 splits the optical signal having a wavelength included in a second wavelength group from an optical signal transmitted via the optical communication cable C32 and outputs the split optical signal to the transmitter/receiver (Tx/Rx) 22-1. The second wavelength group includes wavelengths assigned to the optical communication between the BBU of the transmitter/receiver (Tx/Rx) 22-1 and the RRH of the terminal-side device 40 among the wavelengths available for wavelength division multiplexing in the communication network NW. The wavelengths included in the second wavelength group are different from the wavelengths included in the first wavelength group.

The transmitter/receiver (Tx/Rx) 22-1 converts the optical signal input from the optical dropping unit (DRP) 212 into an electrical signal and executes transmission BB signal processing on the data conveyed by the converted electrical signal. The transmitter/receiver (Tx/Rx) 22-1 converts the electrical signal, which is the processed BB signal, into an optical signal and transmits the converted optical signal to the terminal-side device 40 via the optical communication cable C11. The transmission of the optical signal may be referred to as the output of the optical signal. Also, the reception of the optical signal may be referred to as the input of the optical signal.

The transmitter/receiver (Tx/Rx) 22-1 receives the optical signal from the terminal-side device 40 via the optical communication cable C11 and converts the received optical signal into an electrical signal. Further, the transmitter/receiver (Tx/Rx) 22-1 executes reception BB signal processing on the BB signal, which is the converted electrical signal, converts the electrical signal conveying the processed data into an optical signal, and outputs the converted optical signal to the optical adding unit (ADD) 211.

The optical adding unit (ADD) 214 inserts the optical signal having a wavelength included in the third wavelength group, which is input from the transmitter/receiver (Tx/Rx) 22-2, into the optical signal transmitted via the optical communication cable C32. The third wavelength group includes a wavelength assigned to the optical communication between the BBU of the transmitter/receiver (Tx/Rx) 22-2 and the RRH of the terminal-side device 40 or 50 among the wavelengths available for the wavelength division multiplexing in the communication network NW. The wavelengths included in the third wavelength group are different from the wavelengths included in the first and the second wavelength groups.

As described later, the assignment of a wavelength to the optical communication between the BBU of the transmitter/receiver (Tx/Rx) 22-2 and the RRHs of the terminal-side devices 40 or 50 is carried out by the control device 10. In this regard, if a wavelength is not assigned to the optical communication between the BBU of the transmitter/receiver (Tx/Rx) 22-2 and the RRH of the terminal-side devices 40 or 50, the optical adding unit (ADD) 214 does not insert the optical signal.

The optical dropping unit (DRP) 213 splits the optical signal having a wavelength included in a fourth wavelength group from an optical signal transmitted via the optical communication cable C31 and outputs the split optical signal to the transmitter/receiver (Tx/Rx) 22-2. The fourth wavelength group includes wavelengths assigned to the optical communication between the BBU of the transmitter/receiver (Tx/Rx) 22-2 and the RRH of the terminal-side device 40 or 50 among the wavelengths available for wavelength division multiplexing in the communication network NW. The wavelengths included in the fourth wavelength group are different from the wavelengths included in the first to the third wavelength groups. In this regard, if a wavelength is not assigned to the optical communication between the BBU of the transmitter/receiver (Tx/Rx) 22-2 and the RRH of the terminal-side devices 40 or 50, the optical dropping unit (DRP) 213 does not split the optical signal.

The ROADM 31 includes an optical adding unit (ADD) 311, an optical dropping unit (DRP) 312, and an optical coupler 313.

The optical adding unit (ADD) 311 inserts the optical signal having a wavelength included in the fifth wavelength group, which is input from the transmitter/receiver (Tx/Rx) 32-1, into the optical signal transmitted via the optical communication cable C31. The fifth wavelength group includes a wavelength assigned to the optical communication between the BBU of the transmitter/receiver (Tx/Rx) 32-1 and the RRH of the terminal-side device 50 among the wavelengths available for the wavelength division multiplexing in the communication network NW. The wavelengths included in the fifth wavelength group are different from the wavelengths included in the first to the fourth wavelength groups.

The optical dropping unit (DRP) 312 splits the optical signal having a wavelength included in a sixth wavelength group from an optical signal transmitted via the optical communication cable C32 and outputs the split optical signal to the transmitter/receiver (Tx/Rx) 32-1. The sixth wavelength group includes wavelengths assigned to the optical communication between the BBU of the transmitter/receiver (Tx/Rx) 32-1 and the RRH of the terminal-side device 50. The wavelengths included in the sixth wavelength group are different from the wavelengths included in the first to the fifth wavelength groups.

The transmitter/receiver (Tx/Rx) 32-1 converts the optical signal input from the optical dropping unit (DRP) 312 into an electrical signal and executes transmission BB signal processing on the data conveyed by the converted electrical signal. The transmitter/receiver (Tx/Rx) 32-1 converts the electrical signal, which is a processed BB signal, into an optical signal and transmits the converted optical signal to the terminal-side device 50 via the optical communication cable C22.

The transmitter/receiver (Tx/Rx) 32-1 receives the optical signal from the terminal-side device 50 via the optical communication cable C22 and converts the received optical signal into an electrical signal. Further, the transmitter/receiver (Tx/Rx) 32-1 executes reception BB signal processing on the BB signal, which is the converted electrical signal, converts the electrical signal representing the processed data into an optical signal, and outputs the converted optical signal to the optical adding unit (ADD) 311.

Further, the optical adding unit (ADD) 311 inserts the optical signal having a wavelength included in the third wavelength group, which is transmitted from the terminal-side device 40 and input via the optical communication cable C21 and the optical coupler 313, into the optical signal transmitted via the optical communication cable C31. In addition, the optical dropping unit (DRP) 312 splits the optical signal having a wavelength included in the fourth wavelength group from the optical signal transmitted via the optical communication cable C32 and transmits the split optical signal to the terminal-side device 40 via the optical coupler 313 and the optical communication cable C21.

The switch 24 switches the state among a first state, a second state, and a third state. The first state is a state in which the transmitter/receiver (Tx/Rx) 22-2 is coupled to the terminal-side device 50 via the switch 24 and the optical communication cable C12. The second state is a state in which the transmitter/receiver (Tx/Rx) 22-2 is coupled to the optical coupler 215 via the switch 24. The third state is a state in which the transmitter/receiver (Tx/Rx) 22-2 is coupled to neither the terminal-side device 50 nor the optical coupler 215.

First State

A description will be given of the case where the switch 24 is in the first state. In this case, the transmitter/receiver (Tx/Rx) 22-2 converts the optical signal input from the optical dropping unit (DRP) 213 into an electrical signal and executes transmission BB signal processing on the data conveyed by the converted electrical signal. The transmitter/receiver (Tx/Rx) 22-2 converts the electrical signal, which is the processed BB signal, into an optical signal and transmits the converted optical signal to the terminal-side device 50 via the switch 24 and the optical communication cable C12.

The transmitter/receiver (Tx/Rx) 22-2 receives an optical signal from the terminal-side device 50 via the optical communication cable C12 and the switch 24 and converts the received optical signal into an electrical signal. Further, the transmitter/receiver (Tx/Rx) 22-2 executes reception BB signal processing on the BB signal, which is the converted electrical signal, converts the electrical signal representing the processed data into an optical signal, and outputs the converted optical signal to the optical adding unit (ADD) 214.

Second State

A description will be given of the case where the switch 24 is in the second state. In this case, the transmitter/receiver (Tx/Rx) 22-2 converts the optical signal input from the optical dropping unit (DRP) 213 into an electrical signal and executes transmission BB signal processing on the data conveyed by the converted electrical signal. The transmitter/receiver (Tx/Rx) 22-2 converts the electrical signal, which is the processed BB signal, into an optical signal, and outputs the converted optical signal to the optical adding unit (ADD) 214 via the switch 24 and the optical coupler 215. The optical adding unit (ADD) 214 inserts an optical signal having a wavelength included in the fourth wavelength group, which is input from the transmitter/receiver (Tx/Rx) 22-2 via the switch 24 and the optical coupler 215, into the optical signal transmitted via the optical communication cable C32.

The optical dropping unit (DRP) 213 splits the optical signal having a wavelength included in the third wavelength group from the optical signal transmitted via the optical communication cable C31 and outputs the split optical signal to the transmitter/receiver (Tx/Rx) 22-2 via the optical coupler 215 and the switch 24. The transmitter/receiver (Tx/Rx) 22-2 converts the optical signal input from the optical dropping unit (DRP) 213 via the optical coupler 215 and the switch 24 into an electrical signal. Further, the transmitter/receiver (Tx/Rx) 22-2 executes reception BB signal processing on the BB signal, which is the converted electrical signal, converts the electrical signal representing the processed data into an optical signal, and outputs the converted optical signal to the optical adding unit (ADD) 214.

Third State

When the switch 24 is in the third state, an optical signal is not output from the transmitter/receiver (Tx/Rx) 22-2.

In this manner, in the present embodiment, the transmitter/receiver (Tx/Rx) 22-2 is configured to be capable of being coupled to the terminal-side device 40 via the optical communication cable C21 that couples the other network-side device 30, which constitutes a set with the network-side device 20, and the terminal-side device 40, which constitutes the set.

In this regard, the number of network-side devices that constitute a set may be three or more. Also, the number of terminal-side devices that constitute a set may be three or more. Also, the number of network-side devices that constitute a set may be different from the number of terminal-side devices that constitute the set. In this case, in the same manner as the present embodiment, the transmitter/receiver (Tx/Rx) 22-2 may be configured to be capable of being coupled to the terminal-side device via the optical communication cable that couples each of the other network-side devices, which constitute a set with the network-side device 20, and the terminal-side device, which constitutes the set. Also, the number of network-side devices that constitute a set may be different for each set. Also, the number of terminal-side devices that constitute a set may be different for each set.

In the present embodiment, the network-side device 20 includes an amplifier A1 that amplifies the optical signal transmitted via the optical communication cable C31 in the preceding stage and the subsequent stage of the ROADM 21 in the optical communication cable C31. In the same manner, the network-side device 30 includes the amplifier A1 that amplifies the optical signal transmitted via the optical communication cable C31 in the preceding stage and the subsequent stage of the ROADM 31 in the optical communication cable C31.

Also, in the present embodiment, the network-side device 20 includes an amplifier A2 that amplifies the optical signal transmitted via the optical communication cable C32 in the preceding stage and the subsequent stage of the ROADM 21 in the optical communication cable C32. In the same manner, the network-side device 30 includes the amplifier A2 that amplifies the optical signal transmitted via the optical communication cable C32 in the preceding stage and the subsequent stage of the ROADM 31 in the optical communication cable C31.

Figure 3:
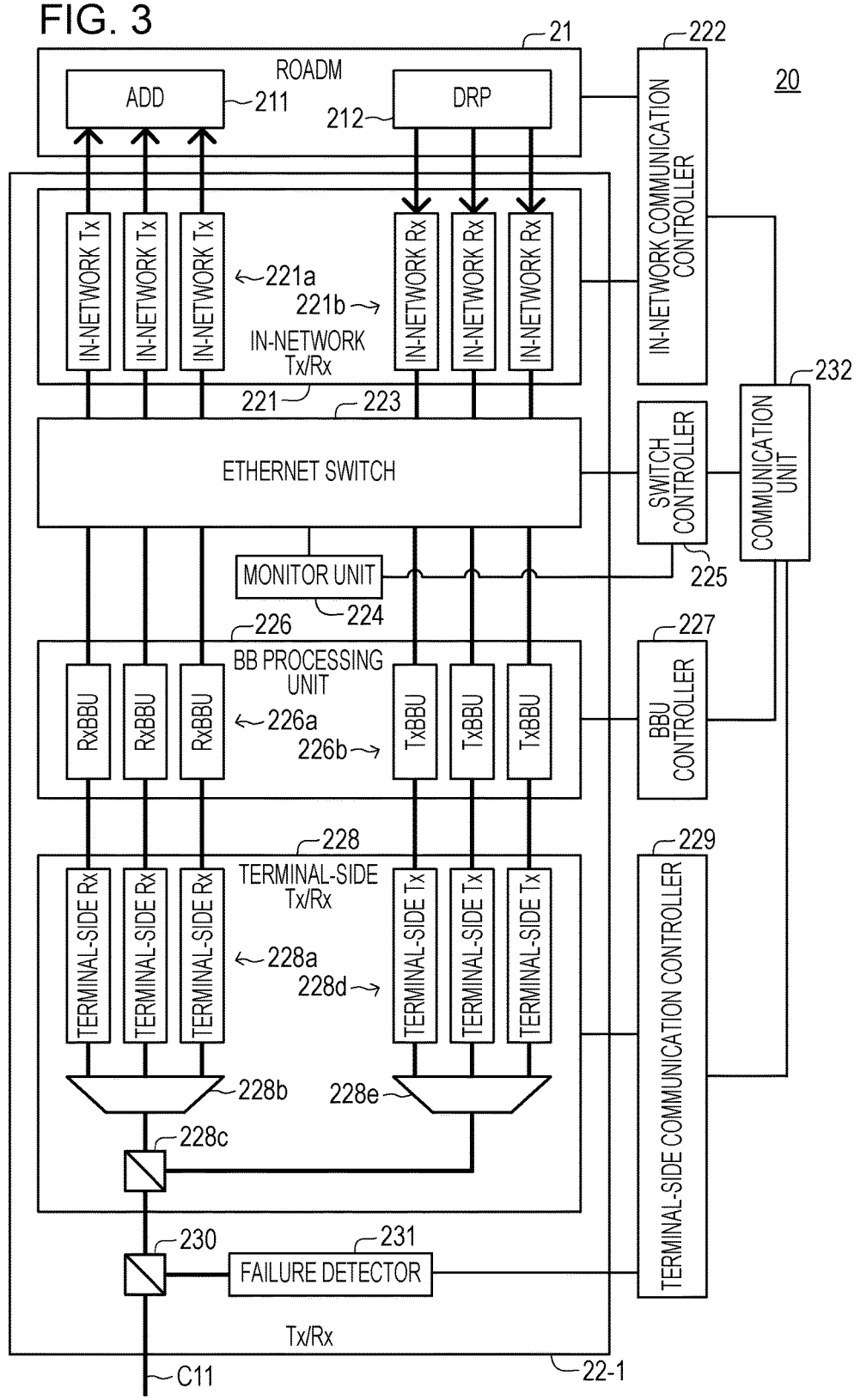
FIG. 3 is a block diagram illustrating an example of a configuration of the transmitter/receiver (Tx/Rx) in FIG. 2.

Next, a description will be given of the transmitter/receiver (Tx/Rx) 22-1 and individual controllers. For example, as illustrated in FIG. 3, the transmitter/receiver (Tx/Rx) 22-1 includes an in-network transmitter/receiver (Tx/Rx) 221, an Ethernet switch 223, a monitor unit 224, a BB processing unit 226, a terminal-side transmitter/receiver (Tx/Rx) 228, an optical coupler 230, and a failure detector 231. Further, for example, as illustrated in FIG. 3, the network-side device 20 includes an in-network communication controller 222, a switch controller 225, a BBU controller 227, a terminal-side communication controller 229, and a communication unit 232.

The transmitter/receiver (Tx/Rx) 22-1 includes P sets of function units that process a downlink signal and function units that process an uplink signal. P is an integer of 1 or more. In the present embodiment, P is 3. The downlink signal is a signal transmitted from the communication network NW to the wireless terminals 61, 62, . . . . The uplink signal is a signal transmitted from the wireless terminals 61, 62, . . . to the communication network NW. In this regard, the number of sets of the above-described function units included in the transmitter/receiver (Tx/Rx) 22-1 may be 1, 2, 4, or more.

The in-network transmitter/receiver (Tx/Rx) 221 includes P in-network transmitters 221a, and P in-network receivers 221b. The in-network transmitter 221a converts the electrical signal input from the Ethernet switch 223 into an optical signal and outputs the converted optical signal to the optical adding unit (ADD) 211. The in-network receiver 221b converts the optical signal split by the optical dropping unit (DRP) 212 into an electrical signal and outputs the converted electrical signal to the Ethernet switch 223.

In the present embodiment, the wavelengths of the optical signals that are output by P in-network transmitters 221a correspond respectively to P wavelengths included in the first wavelength group. In the present embodiment, the wavelengths of the optical signals that are input into P in-network receivers 221b correspond respectively to P wavelengths included in the second wavelength group.

The received control signal is input from the control device 10 to the in-network communication controller 222 via the communication unit 232. The in-network communication controller 222 controls the wavelength of the optical signal used in the ROADM 21 and the in-network transmitter/receiver (Tx/Rx) 221 based on the input control signal. Also, the in-network communication controller 222 manages information regarding the wavelength of the optical signal used in the ROADM 21 and the in-network transmitter/receiver (Tx/Rx) 221.

The Ethernet switch 223 selects an output destination of the signal input from the RxBBU 226a, described later, from P in-network transmitters 221a in accordance with the Ethernet ("Ethernet" is a registered trademark) system and outputs the input signal to the selected output destination. In the same manner, the Ethernet switch 223 selects an output destination of the signal input from the in-network receiver 221b in accordance with the Ethernet system from P TxBBUs 226b, described later, and outputs the input signal to the selected output destination.

The monitor unit 224 detects the amounts of information (in other words, the amount of traffic) that have individually been input to or output from the RxBBU 226a and the TxBBU 226b per unit time. Detecting the amount of traffic may be considered as monitoring the amount of traffic. The amount of traffic may be considered as a communication speed.

The received control signal is input from the control device 10 to the switch controller 225 via the communication unit 232. The switch controller 225 controls the output destination of the signal in the Ethernet switch 223 based on the input control signal. Also, the switch controller 225 manages the information on the amount of traffic, which has been detected by the monitor unit 224. The switch controller 225 transmits the information on the amount of traffic to the control device 10 via the communication unit 232.

The BB processing unit 226 includes P RxBBUs 226a and P TxBBUs 226b. RxBBU is an abbreviation for Reception Baseband Unit. TxBBU is an abbreviation for Transmission Baseband Unit.

RxBBU 226a executes reception BB signal processing on the BB signal input from the terminal-side transmitter/receiver (Tx/Rx) 228 and outputs the processed data to the Ethernet switch 223. TxBBU 226b executes transmission BB signal processing on the data input from the Ethernet switch 223 and outputs the processed BB signal to the terminal-side transmitter/receiver (Tx/Rx) 228.

The received control signal is input from the control device 10 to the BBU controller 227 via the communication unit 232. The BBU controller 227 controls coupling of RxBBU 226a and TxBBU 226b, and RRH described later based on the input control signal.

Also, the BBU controller 227 processes the control signal transmitted to and received from the terminal-side device 40 so as to obtain information on the number of users described later and manages the obtained information. In the present embodiment, the control signal is transmitted via the optical communication cable C11. In this regard, the control signal may be transmitted via a communication cable different from the optical communication cable C11. The BBU controller 227 transmits information on the number of users to the control device 10 via the communication unit 232.

The set of RxBBU 226a and TxBBU 226b may be referred to as BBU. Also, BBU may be referred to as Radio Equipment Controller (REC).

The terminal-side transmitter/receiver (Tx/Rx) 228 includes P terminal-side receivers 228a, a demultiplexer 228b, an optical coupler 228c, P terminal-side transmitters 228d, and a multiplexer 228e.

The demultiplexer 228b splits (in other words, demultiplexes) the optical signal received from the terminal-side device 40 via the optical communication cable C11, an optical coupler 230 described later, and an optical coupler 228c into optical signals having P wavelengths included in the first wavelength group, and outputs the split optical signals to P terminal-side receivers 228a, respectively. The terminal-side receiver 228a converts the optical signal input from the demultiplexer 228b into an electrical signal and outputs the converted electrical signal to RxBBU 226a.

The terminal-side transmitter 228d converts the electrical signal input from TxBBU 226b into an optical signal and outputs the converted optical signal to the multiplexer 228e. In the present embodiment, the wavelengths of the optical signals that are output by the P terminal-side transmitters 228d are P wavelengths included in the second wavelength group, respectively. The multiplexer 228e multiplexes the optical signals input from the P terminal-side transmitters 228d and transmits the multiplexed optical signal to the terminal-side device 40 via the optical coupler 228c, an optical coupler 230 described later, and the optical communication cable C11.

The optical coupler 230 splits the optical signal received from the terminal-side device 40 via the optical communication cable C11, and outputs the split optical signal to the failure detector 231. The failure detector 231 detects the occurrence of a failure in the optical communication via the optical communication cable based on the optical signal input from the optical coupler 230.

In the present embodiment, if the intensity of the optical signal input from the optical coupler 230 is less than a predetermined threshold value, the failure detector 231 detects that a failure has occurred in the optical communication cable C11. On the other hand, if the intensity of the optical signal input from the optical coupler 230 is equal to or higher than the threshold value, the failure detector 231 detects that a failure has not occurred in the optical communication cable C11 (in other words, does not detect the occurrence of a failure).

The received control signal is input from the control device 10 to the terminal-side communication controller 229 via the communication unit 232. The terminal-side communication controller 229 controls the wavelength of the optical signal used in the terminal-side transmitter/receiver (Tx/Rx) 228 based on the input control signal. Also, the terminal-side communication controller 229 manages the information on the wavelength of the optical signal used in the terminal-side transmitter/receiver (Tx/Rx) 228. Further, the terminal-side communication controller 229 manages the information on the occurrence of the failure detected by the failure detector 231.

The transmitter/receivers (Tx/Rx) 22-2 and 32-1 have the same configuration as that of the transmitter/receiver (Tx/Rx) 22-1.

Figure 4:
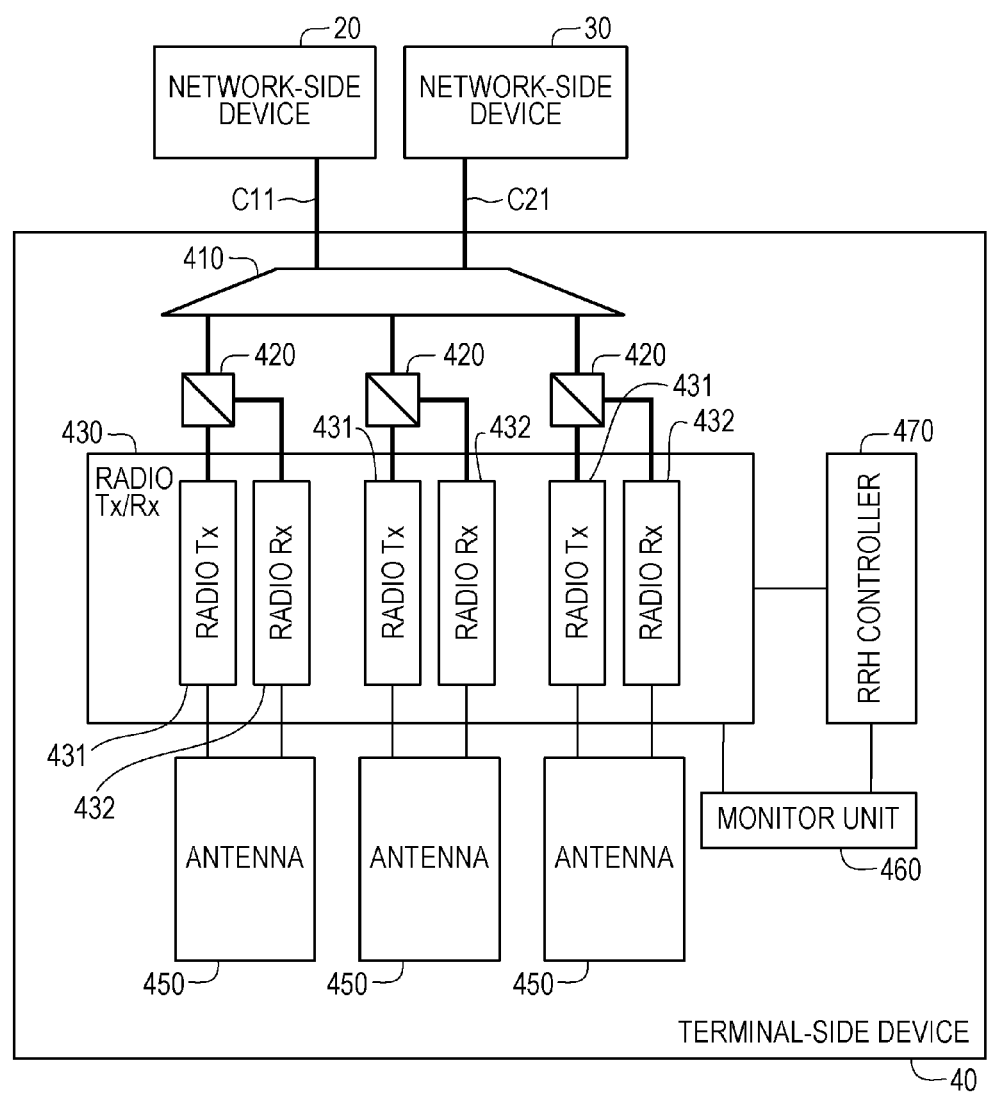
FIG. 4 is a block diagram illustrating an example of a configuration of the terminal-side device in FIG. 1.

Next, a description will be given of the terminal-side device 40. For example, as illustrated in FIG. 4, the terminal-side device 40 includes a multiplexer/demultiplexer 410, P optical couplers 420, a radio transmitter/receiver (Tx/Rx) 430, P antennas 450, a monitor unit 460, and an RRH controller 470. The radio transmitter/receiver (Tx/Rx) 430 includes P radio transmitters 431 and P radio receivers 432.

The multiplexer/demultiplexer 410 receives an optical signal from the network-side device 20 via the optical communication cable C11. Also, the multiplexer/demultiplexer 410 receives an optical signal from the network-side device 30 via the optical communication cable C21.

When the multiplexer/demultiplexer 410 receives an optical signal from the network-side device 20, the multiplexer/demultiplexer 410 splits the optical signal into the optical signals having P wavelengths included in the second wavelength group. Also, when the multiplexer/demultiplexer 410 receives an optical signal from the network-side device 30, the multiplexer/demultiplexer 410 splits the optical signal into the optical signals having P wavelengths included in the fourth wavelength group. The multiplexer/demultiplexer 410 outputs the split optical signals to the P radio transmitters 431 via the optical couplers 420, respectively.

The radio transmitter 431 converts the optical signal input from the multiplexer/demultiplexer 410 via the optical coupler 420 into an electrical signal, converts the BB signal indicated by the converted electrical signal into a radio signal, and transmits the converted radio signal to the wireless terminals 61, 62, . . . via the antenna 450.

The radio receiver 432 receives a radio signal by radio from the wireless terminals 61, 62, . . . via the antenna 450, converts the electrical signal representing the received radio signal into an optical signal, and outputs the converted optical signal to the multiplexer/demultiplexer 410 via the optical coupler 420.

The multiplexer/demultiplexer 410 multiplexes the optical signal input from the P radio receivers 432 via the optical coupler 420. The multiplexer/demultiplexer 410 transmits the multiplexed optical signal to the network-side device 20 via the optical communication cable C11. Also, the multiplexer/demultiplexer 410 transmits the multiplexed optical signal to the network-side device 30 via the optical communication cable C21.

When the multiplexer/demultiplexer 410 transmits the multiplexed optical signal to the network-side device 20 via the optical communication cable C11, the wavelengths of the optical signals output by the P radio receivers 432 have the P wavelengths included in the first wavelength group, respectively. Also, when the multiplexer/demultiplexer 410 transmits the multiplexed optical signal to the network-side device 30 via the optical communication cable C21, the wavelengths of the optical signals output by the P radio receivers 432 have the P wavelengths included in the third wavelength group, respectively.

A set of the radio transmitter 431, the radio receiver 432, and the antenna 450 may be referred to as RRH. Also, RRH may be referred to as Radio Equipment (RE).

Concerning each set of the radio transmitter 431 and the radio receiver 432, the monitor unit 460 detects the number of wireless terminals 61, 62, . . . positioned in a cell formed using the set (in other words, the number of users or the number of terminals). Detecting the number of users may be referred to as monitoring the number of users.

The RRH controller 470 receives a control signal from the network-side device 20 or the network-side device 30 and controls the wavelength of the optical signal used in the radio transmitter/receiver (Tx/Rx) 430 based on the received control signal. Also, the RRH controller 470 manages the information on the wavelength of the optical signal used in the radio transmitter/receiver (Tx/Rx) 430. Also, the RRH controller 470 manages the information on the number of users detected by the monitor unit 460. The RRH controller 470 transmits the information on the number of users to the network-side device 20 or the network-side device 30.

Figure 5:
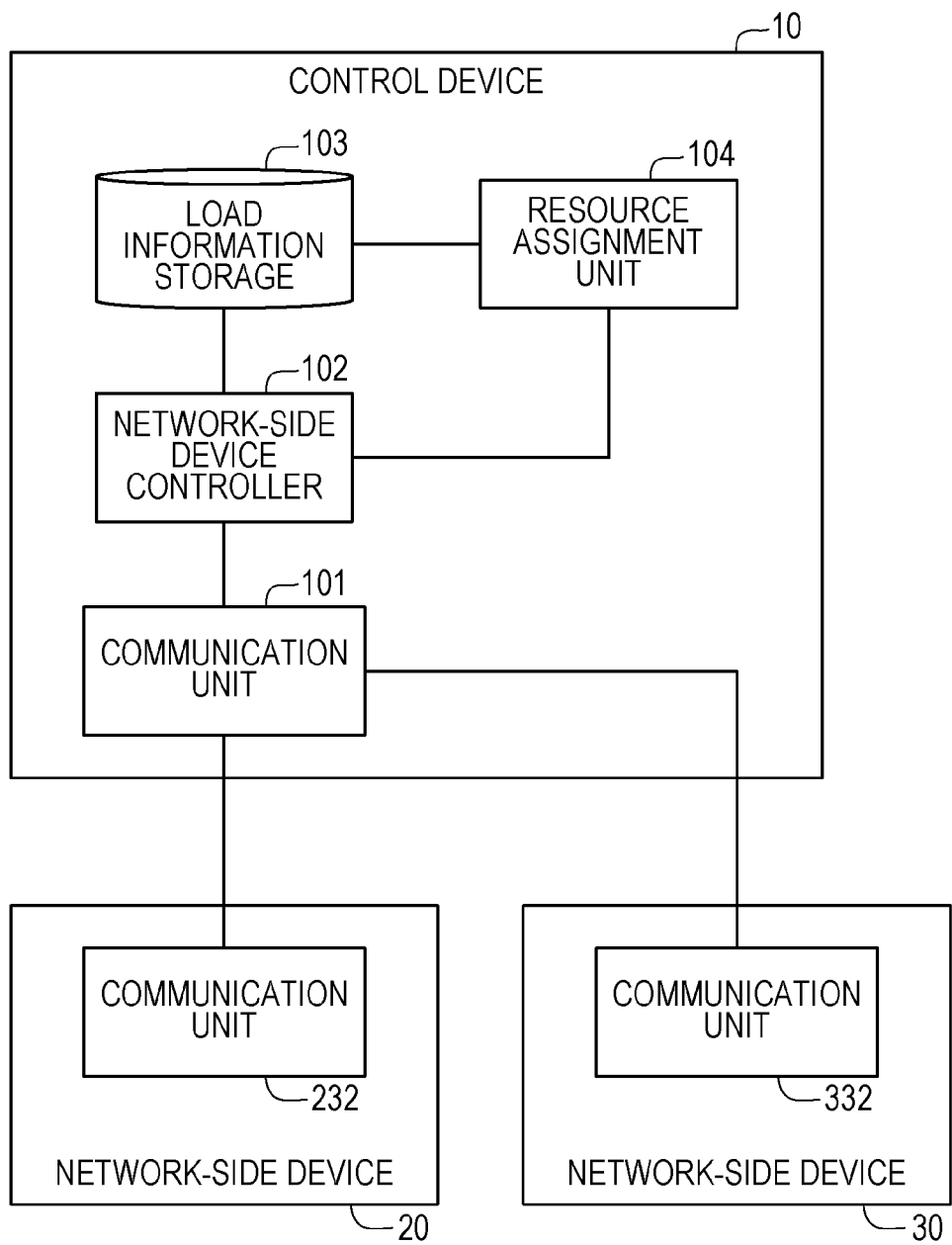
FIG. 5 is a block diagram illustrating an example of a configuration of the control device in FIG. 1.

Next, a description will be given of the control device 10. For example, as illustrated in FIG. 5, the control device 10 includes a communication unit 101, a network-side device controller 102, a load information storage 103, and a resource assignment unit 104. As described above, the network-side device 20 includes a communication unit 232. Also, the network-side device 30 includes a communication unit 332 in the same manner as the network-side device 20.

The communication unit 101 individually transmits and receives a control signal with the communication unit 232 and the communication unit 332. The network-side device controller 102 generates load information based on the control signal received from the network-side device 20 and the network-side device 30, and stores the generated load information in the load information storage 103. The load information storage 103 stores the RRH identification information identifying the RRH, the RRH position, and the RRH load information in association with one another. The RRH identification information may be referred to as the RRHID. In the present embodiment, the load information storage 103 stores the RRHID and the position of RRH in association with each other in advance.

For example, as illustrated in FIG. 6, the load information storage 103 stores the RRHID, the position, and the information indicating the average amount of traffic in association with one another. The average amount of traffic is an example of a load. The information indicating the average amount of traffic is an example of load information. In the present embodiment, the average amount of traffic is a value produced by averaging the amount of traffic over a period from 0 to 24 hours. In this regard, the average amount of traffic may be the amount of traffic over a plurality of days.

The resource assignment unit 104 holds information for identifying a communication path between the network-side devices 20 and 30, and the terminal-side devices 40 and 50 in advance. In the present embodiment, the resource assignment unit 104 holds information for identifying the first communication path between the network-side device 20 and the terminal-side device 40 via the optical communication cable C11. Further, the resource assignment unit 104 holds information for identifying the optical communication cable C22 between the network-side device 30 and the terminal-side device 50 via the second communication path.

Further, the resource assignment unit 104 holds information identifying the third communication path between the network-side device 20 and the terminal-side device 40 via the communication network NW, the network-side device 30, and the optical communication cable C21. Further, the resource assignment unit 104 holds information identifying the fourth communication path between the network-side device 20 and the terminal-side device 50 via the optical communication cable C12.

In the present embodiment, the first and the second communication paths are used as currently used communication paths. Accordingly, 2P (in the present embodiment, 6) wavelengths are assigned to the optical communication using the first communication path in advance. In the present embodiment, the wavelength assigned to the optical communication using the first communication path constitutes the first and the second wavelength groups. Further, 2P (in the present embodiment, 6) wavelengths are assigned to the optical communication using the second communication path in advance. In the present embodiment, the wavelength assigned to the optical communication using the second communication path constitutes the fifth and the sixth wavelength groups.

In the present embodiment, the third and the fourth communication paths are used as preliminary communication paths. If a failure occurs in the currently used communication path, the resource assignment unit 104 selects an RRH that performs optical communication using the preliminary communication path based on the load information stored in the network-side device controller 102.

The resource assignment unit 104 assigns two wavelengths that are different from the wavelengths assigned to the optical communication using the currently used communication path to each of the selected RRHs among the wavelengths available for the wavelength division multiplexing in the communication network NW. In other words, the wavelength assigned to the optical communication using the currently used communication path is the wavelength used in the optical communication between BBU and RRH. In this regard, the description of the function of the resource assignment unit 104 will be complemented by the description of the operation of the wireless communication system 1, which is given later.

The network-side device controller 102 generates a control signal based on the information identifying each of the communication paths, which is held by the resource assignment unit 104, the RRHs selected by the resource assignment unit 104, and the wavelengths assigned to the resource assignment unit 104.

In the present embodiment, the generated control signal includes the RRHID of the selected RRH, the information identifying the preliminary communication path to the selected RRH, and the information identifying the wavelength assigned to the optical communication using the preliminary communication path to the selected RRH.

The network-side device controller 102 transmits the generated control signal to each of the network-side devices 20 and 30 via the communication unit 101. Each of the network-side devices 20 and 30 receives the control signal from the control device 10 by the communication units 232 and 332, respectively. The network-side device 20 controls the ROADM 21, the transmitter/receiver (Tx/Rx) 22-1, the transmitter/receiver (Tx/Rx) 22-2, and the switch 24 in accordance with the received control signal control signal. The network-side device 30 controls the ROADM 31 and the transmitter/receiver (Tx/Rx) 32-1 in accordance with the received control signal.

If a failure occurs in the currently used communication path, the network-side device 20 determines whether a wavelength has been assigned to the optical communication using the preliminary communication path between the RRH that has been performing optical communication using the currently used communication path in which the failure has been detected and the BBU.

If a wavelength has been assigned to the optical communication using the preliminary communication path between RRH that has been performing optical communication using the currently used communication path in which the failure has been detected and the BBU, the network-side device 20 changes the state of the switch 24 from the third state to the first state or the second state. On the other hand, if a wavelength has not been assigned to the optical communication using the preliminary communication path between RRH that has been performing optical communication using the currently used communication path in which the failure has been detected and the BBU, the network-side device 20 maintains the state of the switch 24 in the third state.

In the present embodiment, if the preliminary communication path between RRH that has been performing optical communication using the currently used communication path in which the failure has been detected and the BBU is the third communication path, the network-side device 20 changes the state of the switch 24 to the second state. Also, in the present embodiment, if the preliminary communication path between the RRH that has been performing optical communication using the currently used communication path in which the failure has been detected and the BBU is the fourth communication path, the network-side device 20 changes the state of the switch 24 to the first state. Thereby, if the occurrence of a failure is detected in the currently used communication path, optical communication using the preliminary communication path is performed.

Operation

A description will be given of operation of the wireless communication system 1. First, the wireless communication system 1 operates by performing optical communication using the currently used communication path. Thereby, the control device 10 receives the control signal including the information on the amount of traffic and the number of users from each of the network-side devices 20 and 30.

Then in the present embodiment, after a predetermined time period has passed, the control device 10 generates the information indicating the average amount of traffic produced by averaging the amount of traffic of each of the candidate RRHs to which a wavelength is assigned over the time period as load information. Further, the control device 10 stores the generated load information, the RRHID, and the position of the RRH in association with one another. The generation of the load information is an example of obtaining a load.

In this regard, the control device 10 may use the average number of users as the load in place of the average amount of traffic. The average number of users is the value produced by averaging the number of users over the above-described time period. Also, the control device 10 may use the average number of users as the load in addition to the average amount of traffic. For example, the control device 10 may use, as the load, a parameter that increases as the average amount of traffic become higher, and that increases as the average number of users becomes larger.

Figure 7:
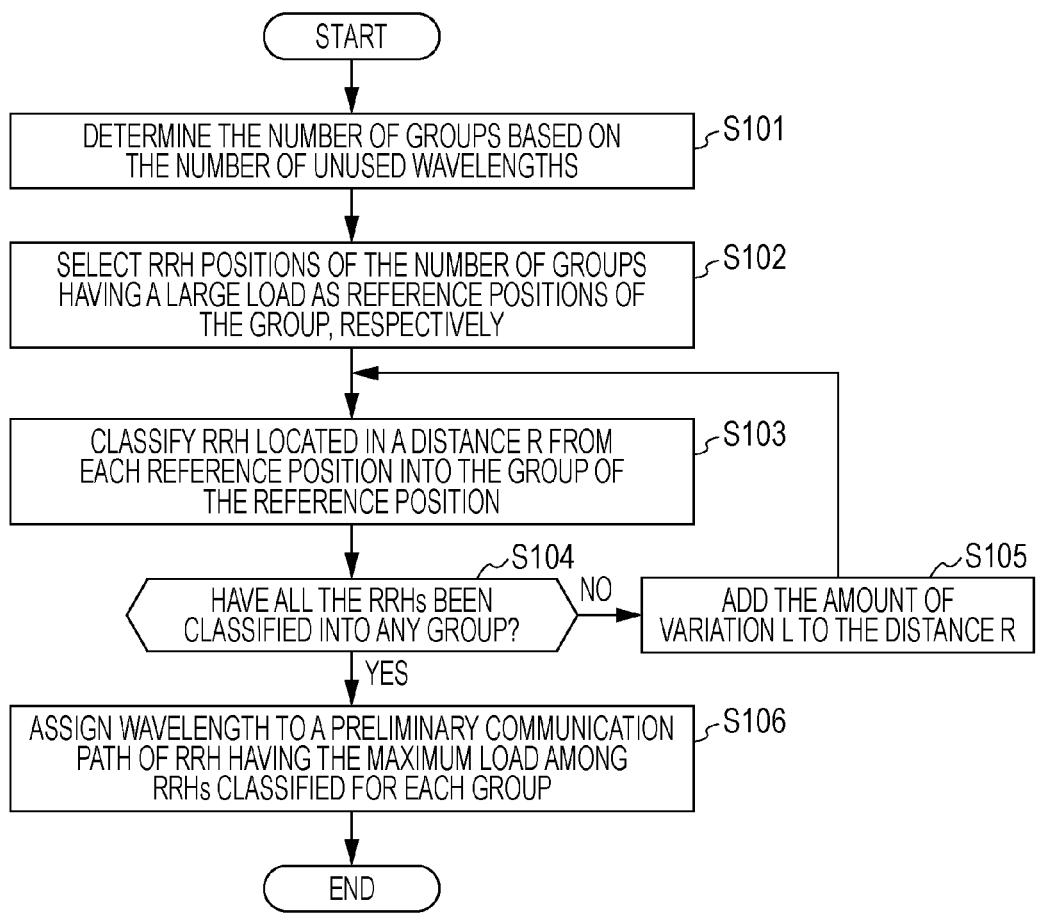
FIG. 7 is a flowchart illustrating an example of processing executed by the control device in FIG. 1.

After that, the control device 10 executes the processing illustrated in FIG. 7, for example. A description will be given below of the processing illustrated in FIG. 7. The control device 10 determines the number of groups based on the number of unused wavelengths (operation S101). The number of unused wavelengths is the number of wavelengths (in other words, unused wavelengths) that are different from the wavelength assigned to the optical communication using the currently used communication path (in other words, the wavelength used for the optical communication between BBU and RRH) among the wavelength available for the wavelength division multiplexing in the communication network NW. As described later, the number of groups is the number of groups in which RRHs are classified.

In the present embodiment, the control device 10 determines the quotient when the number of unused wavelengths is divided by 2 as the number of groups. In this regard, the control device 10 may determines that a value less than the quotient when the number of unused wavelengths is divided by 2 as the number of groups.

Next, the control device 10 selects RRH positions of the number of groups having a large load as reference positions of the group, respectively (operation S102). In the present embodiment, the control device 10 extracts RRHs of the number of groups in descending order of the load, and selects the RRH positions of the extracted number of groups as group reference positions of the number of groups, respectively. The group reference positions are examples of the positions associated with the group.

Next, the control device 10 classifies RRHs positioned within a predetermined distance R from each of the selected reference positions into groups of the reference positions (operation S103). The control device 10 then determines whether or not all the candidate RRHs to which a wavelength is assigned have been classified into any group (operation S104). In the present embodiment, the candidate RRHs to which a wavelength is assigned are the RRHs included in the terminal-side devices 40 and 50.

If at least one of the candidate RRHs to which a wavelength is assigned is not classified into any group, the control device 10 determines as "No", and adds a predetermined amount of variation L to the distance R (operation S105). The amount of variation L has a positive value. Next, the processing of the control device 10 returns to operation S103, and the processing from operation S103 to operation S105 is repeatedly executed until all the candidate RRHs to which a wavelength is assigned are classified into any group.

If all the candidate RRHs to which a wavelength is assigned have been classified into any group, the control device 10 determines as "Yes" in operation S104. Then the control device 10 selects the RRH having the maximum load among the RRHs classified into the group for each of the number of groups as an RRH for performing optical communication using the preliminary communication path when a failure occurs in the currently used communication path.

Further, the control device 10 assigns two unused wavelengths for each of the selected RRHs among the wavelengths available for the wavelength division multiplexing in the communication network NW (operation S106). The two the wavelengths assigned to the selected RRH are different for each RRH.

The assignment of the wavelength to the selected RRH may be referred to as the assignment of the wavelength to the optical communication using the preliminary communication path between the RRH and the BBU, which is carried out if a failure occurs in the currently used communication path between the RRH and the BBU. The control device 10 then terminates the processing illustrated in FIG. 7.

After that, the control device 10 generates a control signal based on information for identifying each communication path, the RRH selected as the RRH that performs optical communication using the preliminary communication path if a failure occurs in the currently used communication path, and the wavelength assigned to the RRH. The control device 10 then transmits the generated control signal to each of the network-side devices 20 and 30.

Each of the network-side devices 20 and 30 receives a control signal from the control device 10. The network-side device 20 controls the ROADM 21, the transmitter/receiver (Tx/Rx) 22-1, the transmitter/receiver (Tx/Rx) 22-2, and the switch 24 in accordance with the received control signal. The network-side device 30 controls the ROADM 31 and the transmitter/receiver (Tx/Rx) 32-1 in accordance with the received control signal.

After that, each of the network-side device 20 and the network-side device 30 monitors the occurrence of a failure in the currently used communication path. If the occurrence of a failure in the currently used communication path is detected, the network-side device 20 determines whether or not a wavelength is assigned to the optical communication using the preliminary communication path between the RRH that has been performing optical communication using the currently used communication path in which the occurrence of a failure occurred and BBU.

If a wavelength is assigned to the optical communication using the preliminary communication path between the RRH that has been performing optical communication using the currently used communication path in which the occurrence of a failure occurred and the BBU, the network-side device 20 changes the state of the switch 24 from the third state to the first state or the second state.

In the present embodiment, if the preliminary communication path between the RRH that has been performing optical communication using the currently used communication path in which the occurrence of a failure was detected and the BBU is the third communication path, the network-side device 20 changes the state of the switch 24 to the second state. Also, in the present embodiment, if the preliminary communication path between the RRH that has been performing optical communication using the currently used communication path in which the occurrence of a failure was detected and the BBU is the fourth communication path, the network-side device 20 changes the state of the switch 24 to the first state. Thereby, if the occurrence of a failure in the currently used communication path is detected, optical communication using the preliminary communication path is carried out.

On the other hand, if a wavelength is not assigned to the optical communication using the preliminary communication path between the RRH that has been performing optical communication using the currently used communication path in which the occurrence of a failure occurred and the BBU, the network-side device 20 maintains the state of the switch 24 to be the third state. In this case, the optical communication using the preliminary communication path is not carried out.

As described above, in the optical communication system according to the first embodiment, the network-side device 20 is coupled to the terminal-side device 40 via the communication network NW, the network-side device 30, and the optical communication cable C21 so as to perform optical communication between the network-side device 20 and the terminal-side device 40.

Thereby, the network-side device 30 does not have to process a signal transmitted by optical communication via the optical communication cable C21, and it is possible for the network-side device 20 to process the signal so as to perform the optical communication. Accordingly, the network-side device 30 does not have to be provided with a function unit of processing a signal transmitted by optical communication via the optical communication cable C21, and thus it is possible to reduce the number of function units that process the signal transmitted by optical communication.

Also, for example, if a failure occurs in the optical communication between the network-side device 20 and the terminal-side device 40 via the optical communication cable C11, it is possible to perform optical communication between the network-side device 20 and the terminal-side device 40 via the optical communication cable C21 in place of the optical communication cable C11.

Further, an optical communication system according to the first embodiment is provided with the switch 24 that changes the state between the first state and the second state. The first state is a state in which the network-side device 20 is coupled to the terminal-side device 50 via the optical communication cable that couples the network-side device 20 and the terminal-side device 50. The second state is a state in which the network-side device 20 is coupled to the terminal-side device 40 via the communication network NW, the network-side device 30, and the optical communication cable C21.

Thereby, for example, if a failure occurs in the optical communication between the network-side device 30 and the terminal-side device 50 via the optical communication cable C22, it is possible to perform optical communication between the network-side device 20 and the terminal-side device 50 via the optical communication cable C12.

Further, in an optical communication system according to the first embodiment, an unused wavelength is assigned to the optical communication between the network-side device 20 and the terminal-side device 40 via the communication network NW, the network-side device 30, and the optical communication cable C21 among the wavelengths available for the wavelength division multiplexing in the communication network NW.

Thereby, it is possible to set a communication path via the network-side device 20, the communication network NW, and the network-side device 30 in advance with respect to a wavelength assigned to the optical communication via the optical communication cable C21 in a state in which the other optical communication is performed. Accordingly, it is possible to swiftly change the communication path from the optical communication via the optical communication cable C11 to the optical communication via the optical communication cable C21.

Further, in an optical communication system according to the first embodiment, a plurality of RRHs are classified into a predetermined number of groups. In addition, in the optical communication system, unused wavelengths are assigned to optical communications between the RRHs selected from the RRHs classified into each group from the number of groups and the BBU, respectively among the wavelengths available for the wavelength division multiplexing in the communication network NW.

Thereby, unused wavelengths for the wavelength division multiplexing in the communication network NW are assigned to the optical communication using the preliminary communication path between the selected RRH and the BBU for each group. Accordingly, by suitably classifying a plurality of RRHs, even if a failure has occurred, it is possible for the optical communication system to suitably perform communication via the wireless terminals 61, 62, . . . that perform wireless communication and the RRHs using the preliminary communication path.

Further, in an optical communication system according to the first embodiment, the number of groups is determined in accordance with the number of unused wavelengths among the wavelengths available for the wavelength division multiplexing in the communication network NW. Thereby, it is possible to assign at least one wavelength for each group to the optical communication using the preliminary communication path between the RRH and the BBU.

Further, in an optical communication system according to the first embodiment, the RRHs having a distance of less than or equal to a predetermined threshold value from the position associated with the group are classified into the group for each of the number of groups. Thereby, it is possible to classify the RRHs in accordance with the range of positions. Thereby, if a failure occurs, it is possible to increase the probability for the optical communication system to perform communication with the wireless terminals 61, 62, . . . using the preliminary communication path.

Further, in an optical communication system according to the first embodiment, the RRHs are selected based on the individual loads of the RRHs classified into the groups for each of the number of groups.

Thereby, unused wavelengths are assigned for the wavelength division multiplexing in the communication network NW based on the load of the RRH, and the RRH that performs optical communication using the preliminary communication path is selected. Thereby, for example unused wavelengths for the wavelength division multiplexing in the communication network NW are assigned to the optical communication using the preliminary communication path between the RRH having a relatively large load and the BBU. Accordingly, if a failure occurs, it is possible to increase the probability for the optical communication system to perform communication with the wireless terminals 61, 62, . . . using the preliminary communication path.

First Variation of First Embodiment

Next, a description will be given of a wireless communication system according to a first variation of the first embodiment. The wireless communication system according to the first variation of the first embodiment is different from the wireless communication system according to the first embodiment in the point that the RRH forming a cell including a center of gravity of the load of each group is selected as an RRH that performs optical communication using the preliminary communication path. A description will be given below with a focus on the differences. In this regard, in the description of the first variation of the first embodiment, a part to which the same symbol is given as the symbol used in the first embodiment is the same or a similar part.

Figure 8:
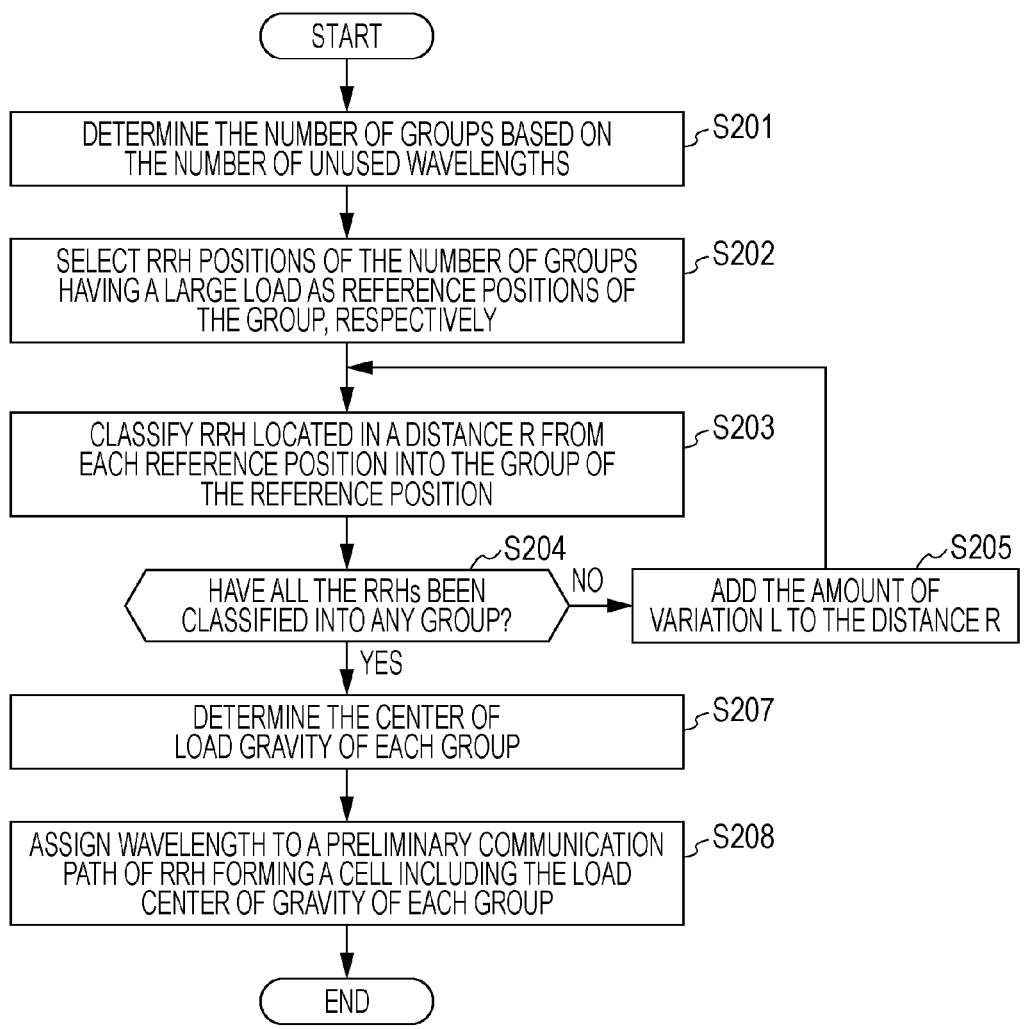
FIG. 8 is a flowchart illustrating an example of processing executed by a control device according to a first variation of the first embodiment.

In the present embodiment, the control device 10 executes the processing illustrated in FIG. 8 in place of the processing illustrated in FIG. 7. The processing illustrated in FIG. 8 is the processing in which the operation S106 in the processing illustrated in FIG. 7 is replaced by the operation S207 and the operation S208. The operations S201 to S205 of the processing illustrated in FIG. 8 are the same as the operations S101 to S105 in FIG. 7.

If the control device 10 determines as "Yes" in operation S204, the control device 10 determines a center of gravity of the load (in other words, a load's center of gravity) of the group for each of the number of groups (operation S207). In the present embodiment, a load's center of gravity is a position obtained by taking the weighted average of the RRH positions classified into the groups using the classified RRH loads as weights.

Next, the control device 10 selects an RRH that forms a cell including a load's center of gravity among the RRHs classified in the group for each of the number of groups as an RRH that performs optical communication using the preliminary communication path in the case of the occurrence of a failure in the currently used communication path.

Further, the control device 10 assigns two unused wavelengths to each of the selected RRHs among the wavelengths available for the wavelength division multiplexing in the communication network NW (operation S208). The two wavelengths assigned to the selected RRHs are different for each RRH. The control device 10 then terminates the processing illustrated in FIG. 8.

Accordingly, with an optical communication system according to the first variation of the first embodiment, it is possible to have the same effects and advantages as those of the optical communication system according to the first embodiment. Further, with an optical communication system according to the first variation of the first embodiment, it is possible to suitably select an RRH that performs optical communication using the preliminary communication path if a failure occurs in the currently used communication path based on the load's center of gravity. Accordingly, if a failure occurs, it is possible to increase the probability of enabling the optical communication system to communicate with the wireless terminals 61, 62, . . . using the preliminary communication path.

Second Variation of First Embodiment

Next, a description will be given of a wireless communication system according to a second variation of the first embodiment. The wireless communication system according to the second variation of the first embodiment is different from the wireless communication system according to the first embodiment in the point that an RRH that performs optical communication using the preliminary communication path is selected again for each passage of a predetermined cycle. A description will be given below with a focus on the differences. In this regard, in the description of the second variation of the first embodiment, a part to which the same symbol is given as the symbol used in the first embodiment is the same or a similar part.

Figure 9:
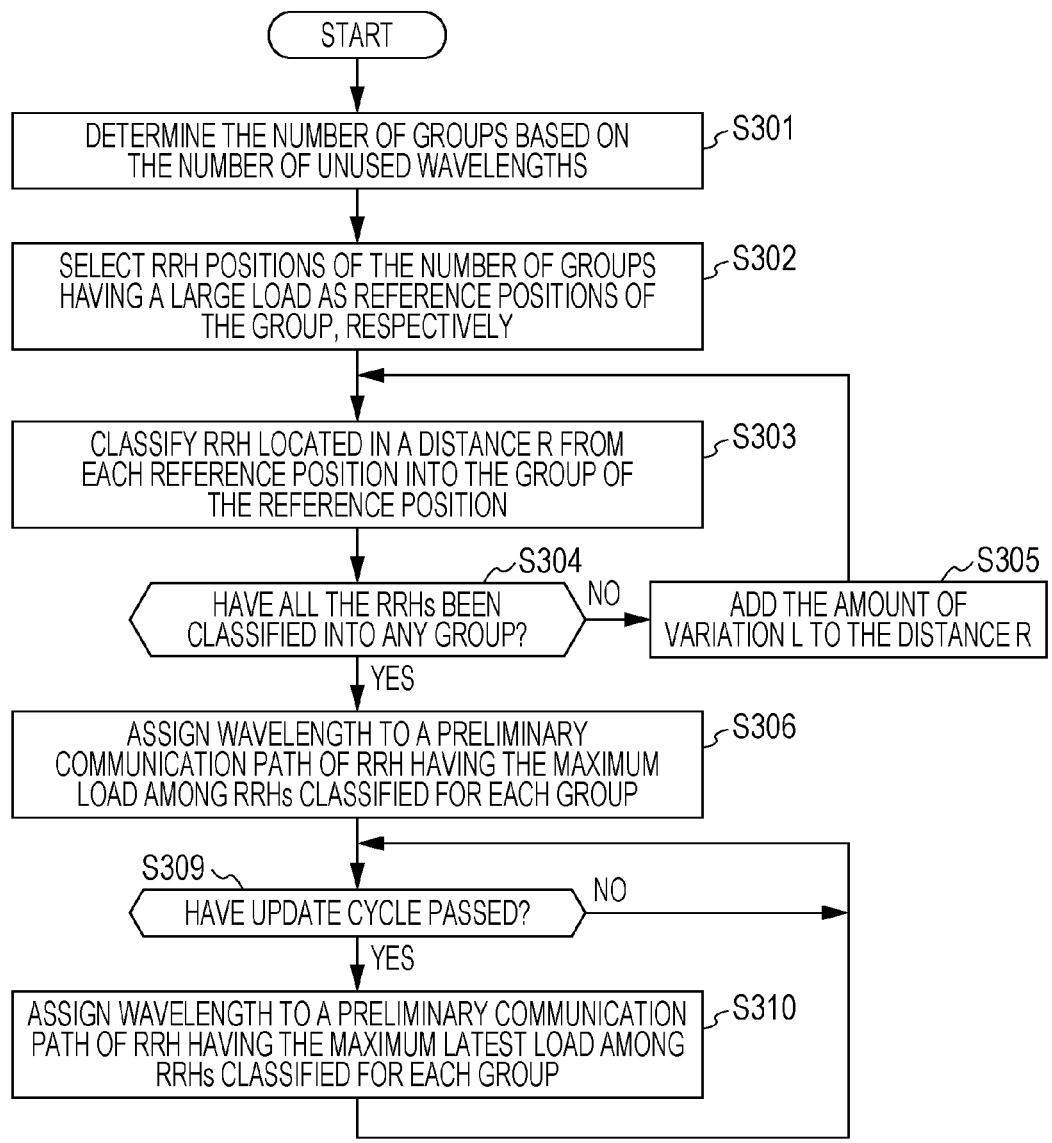
FIG. 9 is a flowchart illustrating an example of processing executed by a control device according to a second variation of the first embodiment.

In the present embodiment, the control device 10 executes the processing illustrated in FIG. 9 in place of the processing illustrated in FIG. 7. The processing illustrated in FIG. 9 is processing in which operation S309 and operation S310 are added after the operation S106 of the processing illustrated in FIG. 7. The operations S301 to S305 of the processing illustrated in FIG. 9 are the same as the operations S101 to S106 in FIG. 7.

In the present embodiment, the control device 10 generates information indicating the average amount of traffic produced by averaging the amount of traffic over the update cycle for each candidate RRH to which a wavelength is assigned for each passage of a predetermined update cycle (in the present embodiment, 10 minutes). Further, the control device 10 stores the generated load information, the RRHID, the position of the RRH in association with one another as illustrated in FIG. 10, for example.

When the control device 10 executes the processing of operation S306, the processing waits until the update cycle has passed ("No" route in operation S309). When the update cycle has passed then, the control device 10 determines as "Yes". Next, the control device 10 selects an RRH having the maximum latest load as an RRH that performs optical communication using the preliminary communication path among the RRHs classified in the group if a failure occurs in the currently used communication path for each of the number of groups.

Further, the control device 10 assigns two unused wavelengths to each of the selected RRHs among the wavelengths available for the wavelength division multiplexing in the communication network NW (operation S310). The two wavelengths assigned to the selected RRHs are different for each RRH.

The processing of the control device 10 then returns to operation S309, and the processing from operation S309 to operation S310 is executed repeatedly.

Accordingly, with an optical communication system according to the second variation of the first embodiment, it is possible to have the same effects and advantages as those of the optical communication system according to the first embodiment. Further, with an optical communication system according to the second variation of the first embodiment, it is possible to suitably select an RRH that performs optical communication using the preliminary communication path if a failure occurs in the currently used communication path based on the latest load. Accordingly, if a failure occurs, it is possible to increase the probability of enabling the optical communication system to communicate with the wireless terminals 61, 62, . . . using the preliminary communication path.

In this regard, the control device 10 may select an RRH that forms a cell including a load's center of gravity in place of selecting an RRH having the maximum load.

Third Variation of First Embodiment

Next, a description will be given of a wireless communication system according to a third variation of the first embodiment. The wireless communication system according to the third variation of the first embodiment is different from the wireless communication system according to the first embodiment in the point that an RRH is selected based on a load for each time frame. A description will be given below with a focus on the differences. In this regard, in the description of the third variation of the first embodiment, a part to which the same symbol is given as the symbol used in the first embodiment is the same or a similar part.

In the present embodiment, the control device 10 generates information indicating the average amount of traffic produced by averaging the amount of traffic for each RRH over each time frame of a plurality of time frames as load information. In the present embodiment, the plurality of time frames include a time frame from 0 to 6 hours, a time frame from 6 to 12 hours, a time frame from 12 to 18 hours, and a time frame from 18 to 24 hours. As illustrated in FIG. 11, the control device 10 stores, for example the generated load information, RRHID, the position of RRH in association with one another for each of the plurality of time frames.

In the present embodiment, if a failure occurs in the currently used communication path, the control device 10 selects an RRH that performs optical communication using the preliminary communication path based on the load information for the time frame including the present time.

Accordingly, with an optical communication system according to the third variation of the first embodiment, it is possible to have the same effects and advantages as those of the optical communication system according to the first embodiment. Further, with an optical communication system according to the third variation of the first embodiment, it is possible to suitably select an RRH that performs optical communication using the preliminary communication path if a failure occurs in the currently used communication path based on the load for each time frame. Accordingly, if a failure occurs, it is possible to increase the probability of enabling the optical communication system to communicate with the wireless terminals 61, 62, . . . using the preliminary communication path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical communication system comprising:
    a first network-side device and a second network-side device each coupled to a communication network;
    a first terminal-side device and a second terminal-side device configured to communicate with the first network-side device and the second network-side device by being coupled to the first network-side device and the second network-side device via a first communication cable and a second communication cable, respectively,
    the first network-side device is coupled to the first terminal-side device via the communication network, the second network-side device, and a third communication cable for coupling the second network-side device and the first terminal-side device so as to communicate between the first network-side device and the first terminal-side device; and
    a switch configured to switch a state between a first state in which the first network-side device is coupled to the second terminal-side device via a fourth communication cable for coupling the first network-side device and the second terminal-side device, and a second state in which the first network-side device is coupled to the first terminal-side device via the third communication cable coupling the communication network to the second network-side device.

2. The optical communication system according to claim 1,
    wherein a wavelength division multiplexing system is performed in the communication network, and
    wherein, among wavelengths available for the wavelength division multiplexing system in the communication network, a wavelength different from wavelengths used in that the first network-side device communicates with the first terminal-side device and the second network-side device communicates with the second terminal-side device is assigned to that the first network-side device communicated with the first terminal-side device via the communication network, the second network-side device, and the third communication cable.

3. The optical communication system according to claim 2, further comprising:
    a plurality of network-side devices including the first network-side device and the second network-side device; and
    a plurality of terminal-side devices including the first terminal-side device and second terminal-side device,
    wherein the plurality of network-side devices include a plurality of Baseband Units (BBUs),
    wherein the plurality of terminal-side devices include a plurality of Remote Radio Heads (RRHs),
    wherein the plurality of RRHs are classified into a predetermined number of groups, and
    wherein, among wavelengths available for the wavelength division multiplexing system in the communication network, a wavelength different from a wavelength used to communicate between a BBU and an RRH is assigned to a respective communication between an RRH selected from the RRHs classified for each of the groups and a BBU for each of the number of groups.

4. The optical communication system according to claim 3,
    wherein the number of groups is determined in accordance with the number of wavelengths different from a wavelength used for the communication between a BBU and an RRH among wavelengths available for the wavelength division multiplexing system in the communication network.

5. The optical communication system according to claim 3,
    wherein an RRH having a distance less than or equal to a predetermined threshold value from a position associated with the group is classified into the group for each of the number of groups.

6. The optical communication system according to claim 3,
    wherein the RRH is selected from the RRHs classified for each of the groups based on each load of the RRH classified into the group for each of the number of groups.

7. An optical communication method applied to an optical communication system including a first network-side device and a second network-side device each coupled to a communication network, and a first terminal-side device and a second terminal-side device configured to communicate with the first network-side device and the second network-side device by being coupled to the first network-side device and the second network-side device via a first communication cable and a second communication cable, respectively, the optical communication method comprising:
    coupling the first network-side device to the first terminal-side device via the communication network, the second network-side device, and a third communication cable for coupling the second network-side device and the first terminal-side device so as to communicate between the first network-side device and the first terminal-side device; and
    switching a state between a first state in which the first network-side device is coupled to the second terminal-side device via a fourth communication cable for coupling the first network-side device and the second terminal-side device, and a second state in which the first network-side device is coupled to the first terminal-side device via the third communication cable coupling the communication network to the second network-side device.

8. The optical communication method according to claim 7,
    wherein a wavelength division multiplexing system is performed in the communication network, and
    wherein, among wavelengths available for the wavelength division multiplexing in the communication network, a wavelength different from wavelengths used in that the first network-side device communicates with the first terminal-side device and the second network-side device communicates with the second terminal-side device is assigned to that the first network-side device communicated with the first terminal-side device via the communication network, the second network-side device, and the third communication cable.

9. The optical communication method according to claim 8,
wherein the optical communication system includes a plurality of network-side devices including the first network-side device and the second network-side device and a plurality of terminal-side devices including the first terminal-side device and the second terminal-side device,
wherein the plurality of network-side devices include a plurality of Baseband Units (BBUs),
wherein the plurality of terminal-side devices include a plurality of Remote Radio Heads (RRHs), and
wherein the plurality of RRHs are classified into a predetermined number of groups,
the optical communication method further comprising:
assigning, among wavelengths available for the wavelength division multiplexing system in the communication network, a wavelength different from a wavelength used to communicate between an RRH selected from the RRHs classified for each of the groups and a BBU for each of the number of groups.

10. The optical communication method according to claim 9,
wherein the number of groups is determined in accordance with the number of wavelengths different from a wavelength used for the communication between a BBU and an RRH among wavelengths available for the wavelength division multiplexing system in the communication network.

11. The optical communication method according to claim 9,
wherein an RRH having a distance less than or equal to a predetermined threshold value from a position associated with the group is classified into the group for each of the number of groups.

12. The optical communication method according to claim 9,
wherein the RRH is selected from the RRHs classified for each of the groups based on each load of the RRH classified into the group for each of the number of groups.

* * * * *